3,392,086
PNEUMATIC EXTENSOMETER, ESPECIALLY
FOR A CREEP CELL
Antoine Bret, Aix-en-Provence, Robert Mennesson, Paris, and Robert Quidu, Courbevoie, France, assignors to Commissariat à l'Energie Atomique, Paris, France
Filed July 12, 1966, Ser. No. 564,558
Claims priority, application France, July 23, 1965, 25,815
8 Claims. (Cl. 176—19)

ABSTRACT OF THE DISCLOSURE

A pneumatic strain gauge takes creep measurements of a test piece in a nuclear reactor by using two detectors one fitted on the test piece and the other located outside the reactor. Each detector has a head nozzle each supplied with gas at the same pressure and each detector is discharged at the same regulated pressure. A capillary tube extends from each detector and connects to oppositely disposed bellows whose movements are amplified and measured.

---

This invention relates to pneumatic extensometer, or strain gauge (gage) which is adaptable in particular to a creep cell, and the configuration of which has a certain similarity with that of a Wheatstone bridge, although it will be understood that its operation is essentially pneumatic.

The extensometer in accordance with the present invention is of particular interest in creep cells, especially for the purpose of taking creep measurements on test-pieces which are placed in a nuclear reactor and subjected to high temperature and to neutron radiation.

It is known that the principle of pneumatic metrology is to represent the variation of a quantity $e$ to be measured (which can be, for example, by means of the rod of an extensometer, the length of a test-piece placed in a creep cell) by a variation in pressure: a pipe which contains two pneumatic resistances is supplied at a constant pressure $p_1$; the upstream resistance is a constant resistance formed by a calibrated orifice which is referred-to as the head nozzle; the downstream resistance which is disposed in series with said head nozzle is a variable resistance or so-called outlet port, the cross-sectional area of which varies with the quantity $e$ to be measured, said variable resistance being materialized, for example, by a cone or a paraboloid of revolution which moves within the outlet port. There corresponds to any variation $\Delta e$ of the quantity $e$ to be measured a variation $\Delta p_2$ of the pressure $p_2$ which prevails within the duct downstream of the head nozzle, a suitable pressure indicator being designed to ensure the correspondence with the measurement of $\Delta e$.

In the description which now follows, a pipe system of the type referred to which comprises a head nozzle and an outlet port will be referred-to as a detector. The extensometer in accordance with the present invention calls for the use of two detectors of this type, namely a detector which is fitted directly on the element whose variations are to be measured (said detector will be designated hereinafter as a basic detector for the sake of convenience of the description) and a reference detector. The head nozzles of said two detectors of the extensometer in accordance with the invention are fed with gas at a given pressure from the same source and, downstream of the outlet ports, the gases which have passed through these two detectors are discharged towards the same exhaust stack at a same regulated pressure.

A capillary tube extends from each of said two detectors; these capillary tubes terminate respectively at each end of a differential pneumatic device (for example which is formed by two bellows in opposition) and transmit to said device the pressures which prevail within the detectors. Said device produces action on a flexible element, the displacements of which are amplified by a micromeasuring device.

Considered solely from the standpoint of configuration, the above assembly is in fact very similar to a Wheatstone bridge. The pipes for the admission of gas to the two head nozzles and the pipes for exhausting gas downstream of the two outlet ports may be considered as corresponding to the four sides or arms of the bridge quadrilateral whilst the capillary tubes and their differential system may be considered as corresponding respectively to the diagonal and to the galvanometer of a Wheatstone bridge.

In one advantageous application, the basic detector is placed in a nuclear reactor and fitted, for example, on the test-piece of a creep cell whilst the reference detector is located outside the reactor.

In the basic detector, the cone which is adapted to move within the outlet port is integral with a rod which is in turn integral with the element whose variations are to be measured (for example the bellows of a creep cell which works in tension), said element being placed within a nuclear reactor, whereas, in the reference detector, the position of said rod which determines the gas pressure within said detector can be adjusted at will, for example by means of a device with push-button control, the rod being locked in any required position, for example by means of calibration blocks or shims.

Should there be no gas pressure drop within the pipes through which the gas is conveyed to the two head nozzles, and assuming that the detectors were of identical constructional design and at the same temperature, the analogy of the pneumatic extensometer according to the invention with a Wheatstone bridge would be somewhat far-fetched. However, it would in fact be possible by suitably calibrating the reference detector, to ensure that the pneumatic differential system indicates a zero pressure difference between the two capillary tubes, in which case the displacement of the reference detector rod is equal to the extent of displacement which it is desired to determine in the element under study (such as the test specimen of a creep cell). The indication of a zero differential pressure by the differential system would then be comparable with the indication by the galvonometer of a Wheatstone bridge of a zero current across the diagonal of said bridge whereas the adjustment of the reference detector would be comparable with the adjustment of one of the four resistances of said bridge.

In such a case, the operation of the extensometer in accordance with the present invention would actually be based on a zero method.

In point of fact, it proves a very difficult matter both to construct detectors which are absolutely identical and to maintain them strictly at the same temperature; it has therefore proved more convenient in practice to maintain the reference detector at room temperature and to make the requisite corrections with the aid of a table of corrections to be applied to the basic detector relatively to the reference detector; said table of corrections takes into account the influence of the temperature of the element under study to which the basic detector is adapted, as well as any other foreseeable causes of disparity.

Even under these conditions, the extensometer in accordance with the invention does in fact operate on the principle of a zero method but provides for the possibility of measurement about the zero point and consequently does not call for any particular precision from the point of view of adjustment.

Due consideration being given to the above principles, the pneumatic extensometer in accordance with the present invention is essentially characterized in that it comprises a pneumatic basic detector which is adapted to the element whose variations are to be measured, a pneumatic reference detector which is maintained at room temperature and adjustable by means of calibration blocks, two pipes for supplying the head nozzles of said two detectors with gas produced by a same source at a given pressure which is established by a first regulator, two pipes located downstream of the outlet ports of said two detectors for discharging the gas which has passed through said detectors to a common exhaust stack at a pressure which is established by a second regulator, a first set of two capillary tubes terminating respectively at each extremity of a first pneumatic differential device and adapted to transmit to said device the pressures which prevail in the two detectors, a second set of two capillary tubes terminating in a second pneumatic differential device and adapted to transmit to said device the feed pressures which prevail upstream of the head nozzles of the two detectors, and a third set of two capillary tubes terminating in a third pneumatic differential device and adapted to transmit to said device the gas pressures which prevail downstream of the outlet ports of said two detectors, each of said differential devices being connected to a micromeasuring device which supplies a large-scale indication of the pressure difference which is applied to the corresponding differential device, the determination of the variation which is to be detected in the element under study (for example the variation in length of a test-piece placed in a creep cell), and which may be of very small value, being obtained by means of correction tables and curves, taking into account the calibration setting of the reference detector and the large-scale indications supplied by the micromeasuring devices.

Other properties and advantages of the invention will be brought out by the description which now follows below in connection with one embodiment of a pneumatic extensometer according to the invention which is given solely by way of non-limitative explanation, reference being made to the accompanying drawings, in which.

Figure 3:
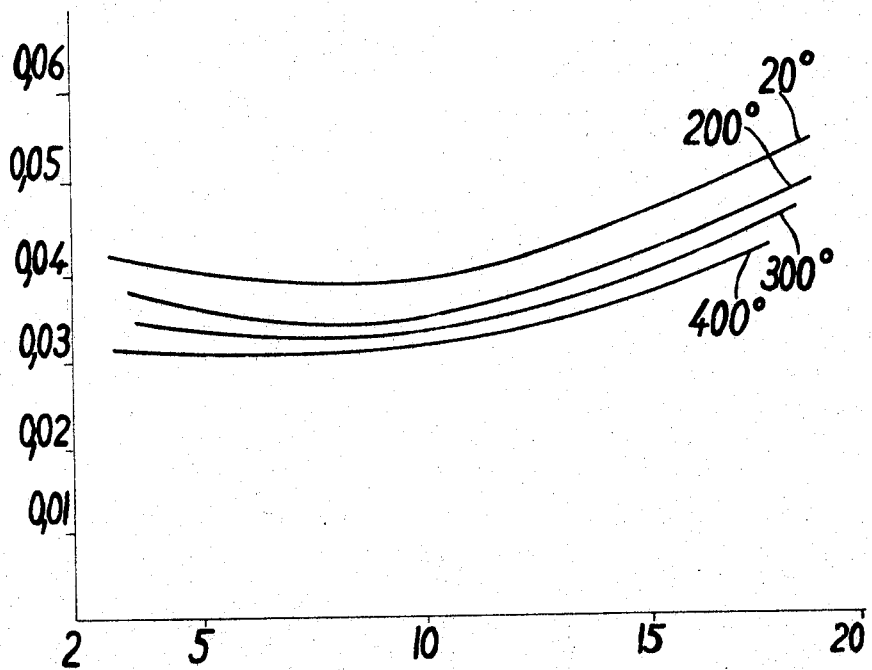

FIG. 3 is a graph which shows a series of correction curves employed for the determination of the variation which it is required to find, taking into account the calibration of the reference detector. These curves, each of which corresponds to a given temperature of the basic detector (respectively, from top to bottom, 20°, 200°, 300° and 400° C.) indicate the correction to be made in the thickness L in millimeters of the calibration block or blocks in order to obtain the displacement in millimeters of the rod of the basic detector (and consequently the variation to be determined of the element being studied such as, for example, the variation in length of a test-piece).

Figure 1:
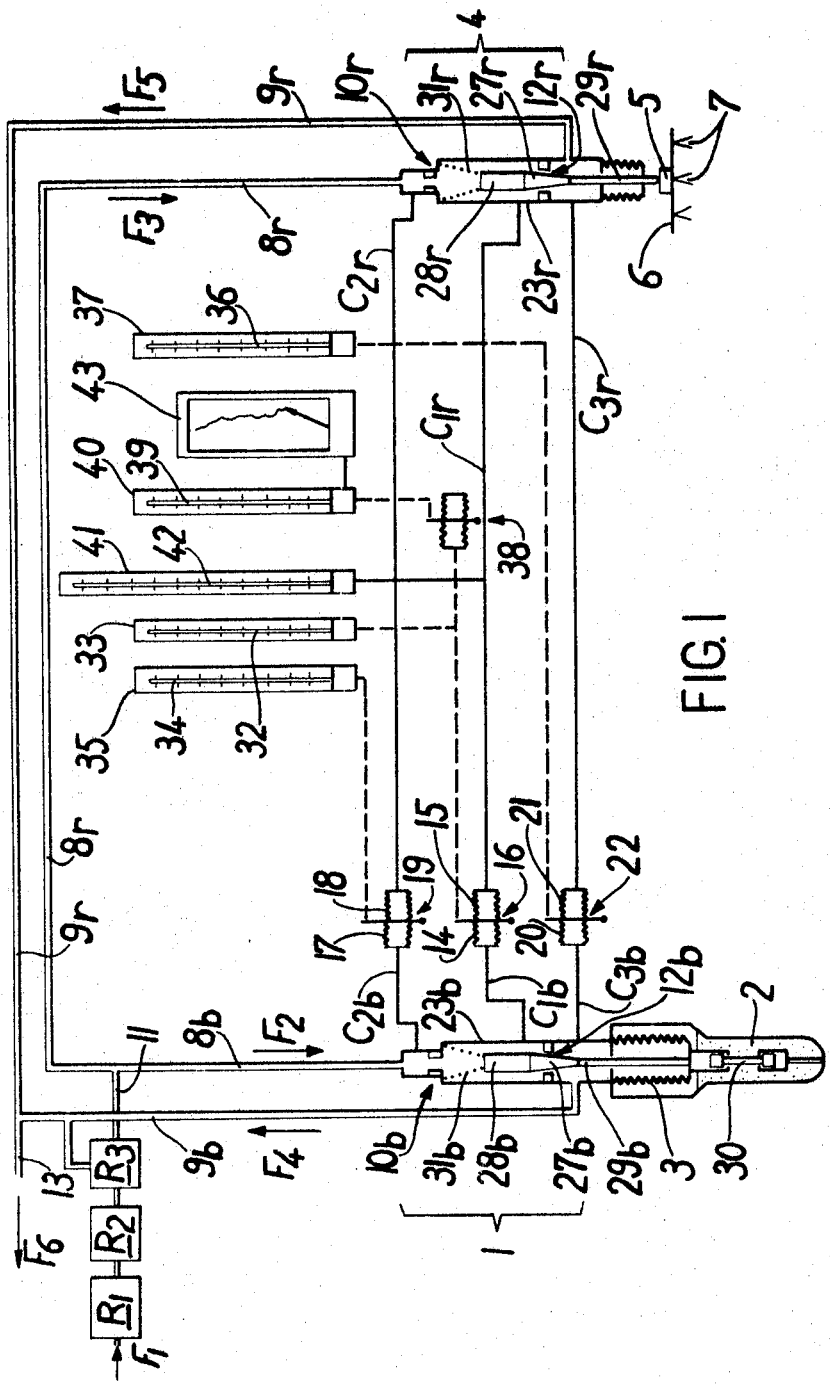
FIG. 1 is a general arrangement diagram of a pneumatic extensometer according to the invention, as adapted to a bellows-type creep cell.

FIG. 1 represents the complete assembly of the pneumatic extensometer in accordance with the invention.

This extensometer essentially comprises the following elements: a basic detector 1 which is fitted on an element whose variations are to be measured (in this case, a creep cell 2 having a bellows 3); a reference detector 4 which is adjustable by means of calibration blocks 5 laid on a base 6 which is supported on three bearing points 7; two pipes 8b and 8c which supply (as shown by the arrows $F_2$ and $F_3$) the head nozzles (respectively designated as 10b and 10r) of said two detectors with neutral gas (for example nitrogen or helium) which is admitted (as shown by the arrow $F_1$) through a common pipe 11 from a source (not shown) such as, for example, a gas cylinder bank at a given pressure which is established, for example, by a reducing-valve regulator $R_1$ which supplies a pressure such as 1 bar and by a regulator $R_2$ having a constant upstream pressure which is fed by $R_1$; two pipes 9b and 9r which are located downstream of the outlet ports (respectively designated as 12b and 12r) of the two detectors and which return (arrows $F_4$ and $F_5$) the neutral gas which has passed through said detectors to an exhaust stack (arrow $F_6$) at a pressure which is fixed by a regulator $R_3$ having a constant downstream pressure and supplied from the discharge side of the regulator $R_2$; a first set of capillary tubes extending in one case (capillary tube $C_1b$) from the basic detector 1 and in other case (capillary tube $C_1r$) from the reference detector 4 and terminating respectively in the bellows 14 and in the bellows 15 of the pneumatic device 16 comprising bellows which act in opposition to each other; a second set of capillary tubes ($C_2b$) and $C_2r$) terminate in the two bellows 17 and 18 of a pneumatic device 19 and transmit to this latter the supply pressures of neutral gas upstream of the head nozzles 10b and 10r; a third set of capillary tubes ($C_3b$ and $C_3r$) which terminate in the bellows 20 and 21 of a pneumatic device 22 and transmit to said device the neutral gas pressures downstream of the outlet ports (12b and 12r) of the two detectors.

Figure 2:
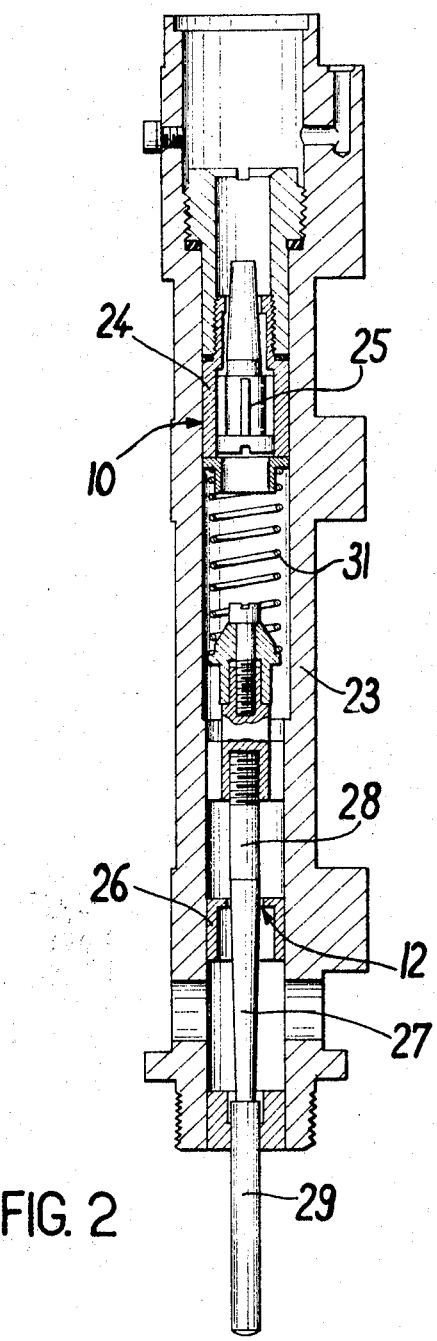
FIG. 2 is a longitudinal sectional view of a detector (basic detector or reference detector) which is employed in the extensometer according to the invention.

As shown on a larger scale in FIG. 2, each detector comprises: a tubular body 23, a head nozzle 10 (nozzles 10b and 10r in FIG. 1) having an annular port formed by the members 24 and 25; an annular outlet port 12 (ports 12b and 12r in FIG. 1) which is delimited by a nozzle 26 and by the cone 27 (designated by the reference 27b and 27r in FIG. 1) which is integral with a cylindrical member 28 (28b, 28r) and with a rod 29 (29b, 28r).

The cross-sectional area of flow of the neutral gas through said port is dependent on the position of the rod 29 and consequently on the dimensional variation to be measured (namely, in FIG. 1, the length of the test-piece 30 of the creep cell 2 or, in the case of the reference detector 4, the thickness L of the calibration block or blocks 5).

Finally, in each detector, a restoring spring 31 (springs 31b and 31r in FIG. 1) maintains the extremity of the rod 29 in contact with the element to be measured in the case of the basic detector or in contact with the calibration block 5 in the case of the reference detector.

As shown in FIG. 1, the bellows-type pneumatic device 16 makes it possible to compare the gas pressures within the two detectors and to represent on the scale 32 of a micromeasuring device 33 the amplified difference (the amplification factor being, for example 7.5) of these two pressures.

The pneumatic device 19 makes it possible to compare the feed gas pressures upstream of the head nozzles 10b and 10r and to represent their amplified difference (factor of 7.5) on the scale 34 of a micromeasuring device 35.

Similarly, the pneumatic device 22 makes it possible to compare the gas pressures downstream of the outlet ports and to represent their amplified difference (factor of 7.5) on the scale 36 of a micromeasuring device 37.

The extensometer in accordance with the invention further comprises the following elements:

(1) A differential pneumatic device 38 (amplification factor of 5) which is connected on the one hand to a constant pressure source and on the other hand to the pressure which is exerted on the manometric tube of the micromeasuring device 33, and which represents the amplified difference of these two pressures on the scale 39 of the micromeasuring device 40. On said scale 39, the difference in gas pressures in the detectors is evidently represented with an amplification factor of 7.5×5, namely 37.5.

(2) A manometric column 41 indicates the neutral gas pressure within the reference detector 4 and gives on a graduated scale 42 the corrections to be made in the readings taken on the scales 32 and 39.

(3) A recorder 43 which can be connected either to the micromeasuring device 33 or to the micromeasuring device 40 with an amplification which is twice as small as that which is obtained on each of said two micromeasuring devices.

The recording is effected by means of a heating stylus on a paper which is coated with a fusible complex having a paraffin-wax base.

It should be noted that the various micromeasuring devices are of the liquid column type which is blue-tinted and miscible neither with water nor with oil. Said devices are fed with air and not with neutral gas by means of a common feed rack which is connected to the supply system by way of a filter reducing valve (not shown). The scales of the manometric columns are centimeter scales, the zero point of which are located at the top. The temperature calibration of the detectors is effected by means of a standard detector.

The operation of the extensometer in accordance with the invention is as follows, two cases of utilization being contemplated.

(a) Measurements taken without changing the calibration setting of the reference detector:

These measurements can be taken only over a range of approximately 1/10 mm. with scale 39 and 5/10 mm. with scale 32.

In order to determine the variation which the test-piece under study has undergone (namely the variation in length of the test-piece of a creep cell in the case of FIG. 1), wherein said variation results in the displacement of the rod 29b and of the cone 27b of the basic detector 1, it is merely necessary to read off the variations on the centimeter scales 32 and 39, to refer to the graph of FIG. 3 (in which the axis of ordinates is graduated in displacements in millimeters of the basic detector rod in the case of a displacement of 10 mm. on scale 32) and to interpolate in the event that the temperature of the basic detector does not correspond to one of the curves drawn on said graph.

FIG. 3 shows, for example that, in the case of a temperature of 380° C. of the basic detector and a calibration setting of 5.4 of the reference detector, a variation of 50 mm. on scale 39 (or of 10 mm. on scale 32) represents a displacement of the rod 29b of the basic detector of 0.030 mm.

(b) Measurements taken by changing the calibration setting of the reference detector:

Use is made of the correction tables and curves, taking into account the calibration setting L of the reference detector, the variations which are read from the various micromeasuring devices, and the temperature.

The extensometer in accordance with the invention has a high level of sensitivity: a lift of 1/100 mm. of the rod 29b of the basic detector 1 is represented by 14.3 mm. of variation in the depth of liquid within the micromeasuring device 40 and 2.8 mm. in the micromeasuring device 33, and by a displacement of the stylus of 7.15 mm. on the recorder which is connected to the micromeasuring device 40 and 1.40 mm. on the recorder which is connected to the micromeasuring device 33.

In view of the fact that it is possible to read a variation of 1 mm. in depth of liquid on the scales and to distinguish two marks spaced at a distance of 0.5 mm. on the recorders, it is apparent that the extensometer in accordance with the invention has a sensitivity of the order of one micron.

The extensometer in accordance with the invention meets with a particularly advantageous application in measurements of deformation such as, for example, in-pile creep. In the case of measurements of this type, the extensometer must be capable of operating during lengthy experiments (conducted over a period of several months) and of retaining high fidelity or, in other words, of remaining free from drift. In order to achieve this result, it is necessary to ensure that the elements and materials employed undergo neither alteration nor modification as a result of radiation and heating produced; and these very conditions are satisfied by the extensometer in accordance with the invention.

What we claim is:

1. A pneumatic extensometer which is adaptable in particular to a creep cell and the configuration of which has a certain similarity with that of a Wheatstone bridge, said extensometer comprising a pneumatic basic detector which is adapted to the element whose variations are to be measured, a pneumatic reference detector which is maintained at room temperature and adjustable by means of calibration blocks, two pipes for supplying the head nozzles of said two detectors with gas produced by a same source at a given pressure which is established by a first regulator, two pipes located downstream of the outlet ports of said two detectors for discharging the gas which has passed through said detectors to a common exhaust stack at a pressure which is established by a second regulator, a first set of two capillary tubes terminating respectively at each extremity of a first pneumatic differential device and adapted to transmit to said device the pressures which prevail in the two detectors, a second set of two capillary tubes terminating in a second pneumatic differential device and adapted to transmit to said device the feed pressures which prevail upstream of the head nozzles of the two detectors, and a third set of two capillary tubes terminating in a third pneumatic differential device and adapted to transmit to said device the gas pressures which prevail downstream of the outlet ports of said two detectors, each of said differential devices being connected to a micromeasuring device which supplies a large-scale indication of the pressure difference which is applied to the corresponding differential device, the determination of the variation which is to be detected in the element under study (for example the variation in length of a test-piece placed in a creep cell), and which may be of very small value, being obtained by means of correction tables and curves, taking into account the calibration setting of the reference detector and the large-scale indications supplied by the micromeasuring devices.

2. An extensometer according to claim 1, wherein said basic detector is placed in a nuclear reactor and the reference detector is located outside the reactor.

3. An extensometer according to claim 1, wherein said basic detector is adapted to a bellows-type creep cell.

4. An extensometer according to claim 1, wherein said pneumatic differential devices are constituted by two bellows which work in opposition to each other.

5. An extensometer according to claim 1, wherein the gas supplied to said detectors is a neutral gas.

6. An extensometer according to claim 5, wherein said gas is nitrogen.

7. An extensometer according to claim 5, wherein said gas is helium.

8. An extensometer according to claim 1, wherein the temperature calibration of said detectors is carried out by means of a standard detector.

References Cited

FOREIGN PATENTS

| 917,899 | 1/1947 | France. |
|---|---|---|
| 1,204,750 | 1/1960 | France. |
| 1,407,817 | 6/1965 | France. |
| 922,339 | 3/1963 | Great Britain. |

OTHER REFERENCES

AECL–1386, August 1961, pp. 1–15.

BENJAMIN R. PADGETT, *Primary Examiner.*

L. DEWAYNE RUTLEDGE, *Examiner.*

H. E. BEHREND, *Assistant Examiner.*